(12) United States Patent
Bullard et al.

(10) Patent No.: US 11,473,616 B2
(45) Date of Patent: Oct. 18, 2022

(54) FLEXURE DEVICE

(71) Applicant: Raytheon Company, Waltham, MA (US)

(72) Inventors: Andrew L. Bullard, Manhattan Beach, CA (US); Hans P. Naepflin, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 903 days.

(21) Appl. No.: 16/167,401

(22) Filed: Oct. 22, 2018

(65) Prior Publication Data

US 2020/0124086 A1    Apr. 23, 2020

(51) Int. Cl.
*F16C 11/12* (2006.01)

(52) U.S. Cl.
CPC .................. *F16C 11/12* (2013.01)

(58) Field of Classification Search
CPC ......... F16C 11/12; F16D 3/005; F16M 11/23; F16M 11/205; G01C 19/22; Y10T 74/1293; Y10T 403/32041; Y10T 403/45; Y10T 403/453; Y10T 403/455; Y10T 403/54
USPC .............. 403/57, 220, 223, 225, 291; 74/5 F
See application file for complete search history.

(56) References Cited

U.S. PATENT DOCUMENTS

| | | |
|---|---|---|
| 2,793,028 A | 5/1957 | Wheeler |
| 3,252,696 A | 5/1966 | Friedel |
| 3,476,029 A | 11/1969 | Schreckendgust |
| 3,813,089 A | 5/1974 | Troeger |
| 3,844,022 A | 10/1974 | Kutash |
| 4,051,499 A | 9/1977 | Kondo |
| 4,497,465 A | 2/1985 | Yeakley et al. |
| 4,592,242 A | 6/1986 | Kempas |
| 4,692,050 A | 9/1987 | Kaufman |
| 4,694,703 A | 9/1987 | Routson |
| 4,802,784 A | 2/1989 | Brooks |

(Continued)

FOREIGN PATENT DOCUMENTS

| | | |
|---|---|---|
| DE | 102014002182 A1 | 8/2015 |
| EP | 0469412 A1 | 2/1992 |

(Continued)

OTHER PUBLICATIONS

International Search Report for International Application No. PCT/US2017/062884 dated Jan. 31, 2018, 14 pages.

(Continued)

*Primary Examiner* — Josh Skroupa

(57) ABSTRACT

A multi-axis flexure device can include a first support base, a second support base, and a central coupler. The multi-axis flexure device can also include a first flexure device rotatably coupling the first support base and the central coupler to one another to facilitate rotation about a first axis, and a second flexure device rotatably coupling the second support base and the central coupler to one another to facilitate rotation about a second axis. Each flexure device can include a first flexure, a second flexure, and a flexure coupler coupled to the first and second flexures. The first flexure and the second flexure of the first flexure device can, respectively, be coupled to the first support base and the central coupler. The first flexure and the second flexure of the second flexure device can, respectively, be coupled to the second support base and the central coupler.

22 Claims, 6 Drawing Sheets

(56) References Cited

U.S. PATENT DOCUMENTS

| | | |
|---|---|---|
| 4,812,072 A | 3/1989 | Brooks |
| 4,850,697 A | 7/1989 | Schoennauer et al. |
| 4,997,123 A | 3/1991 | Backus et al. |
| 5,061,107 A | 10/1991 | Brooks |
| 5,173,728 A | 12/1992 | Sangregory et al. |
| 5,213,436 A * | 5/1993 | Fichtner .................. F16C 11/12 403/220 |
| 5,265,853 A | 11/1993 | Szirtes |
| 5,335,418 A | 8/1994 | Krivec |
| 5,498,095 A | 3/1996 | Krivec |
| 5,620,169 A | 4/1997 | Payne |
| 5,706,120 A | 1/1998 | O'Brien et al. |
| 6,146,044 A | 11/2000 | Calvet |
| 6,157,100 A | 12/2000 | Mielke |
| 6,479,782 B1 | 11/2002 | Blackburn |
| 6,666,612 B2 | 12/2003 | Lorigny et al. |
| 6,846,241 B2 * | 1/2005 | Kirschey ................. F16D 3/005 464/98 |
| 6,896,384 B2 | 5/2005 | McWhirter et al. |
| 8,147,151 B2 | 4/2012 | Chou |
| 8,313,255 B2 | 11/2012 | Viglione et al. |
| 8,333,521 B2 | 12/2012 | Viglione |
| 8,556,533 B2 | 10/2013 | Bullard |
| 8,708,593 B2 | 4/2014 | Stratton |
| 8,727,548 B1 * | 5/2014 | Obrien .................. G02B 7/182 359/872 |
| 9,140,042 B2 * | 9/2015 | Erlich .................... F16C 11/12 |
| 9,176,299 B2 * | 11/2015 | Bremer ................. G02B 7/182 |
| 9,671,676 B2 | 6/2017 | Agapescu |
| 9,798,220 B2 | 10/2017 | Henry et al. |
| 2005/0189825 A1 | 9/2005 | Brodt et al. |
| 2007/0008502 A1 | 1/2007 | Lee et al. |
| 2007/0067953 A1 * | 3/2007 | Vermeulen .............. F16C 11/12 16/225 |
| 2008/0216286 A1 | 9/2008 | Bertele et al. |
| 2008/0218109 A1 | 9/2008 | Komori et al. |
| 2012/0076486 A1 | 3/2012 | Bai et al. |
| 2012/0321292 A1 | 12/2012 | Viglione et al. |
| 2013/0129407 A1 | 5/2013 | Bullard |
| 2013/0308997 A1 | 11/2013 | Smith |
| 2014/0023428 A1 | 1/2014 | Kappel et al. |
| 2018/0209475 A1 | 7/2018 | Balaban et al. |
| 2020/0128164 A1 | 4/2020 | Balaban et al. |

FOREIGN PATENT DOCUMENTS

| | | | |
|---|---|---|---|
| EP | 0840023 A1 | 5/1998 | |
| FR | 2797923 A1 | 3/2001 | |
| GB | 1427170 A | 3/1976 | |
| JP | 02268219 A * | 11/1990 | ......... Y10T 74/1293 |
| JP | 03-003488 A | 1/1991 | |
| JP | H0674247 A | 3/1994 | |
| JP | 11-338001 A | 12/1999 | |
| JP | 2006-284995 A | 10/2006 | |
| WO | WO 2004/061320 A1 | 7/2004 | |

OTHER PUBLICATIONS

International Search Report for International Application No. PCT/US2019/047784 dated Nov. 15, 2019, 15 pages.

International Search Report for International Application No. PCT/US2019/047782 dated Nov. 27, 2019, 14 pages.

* cited by examiner

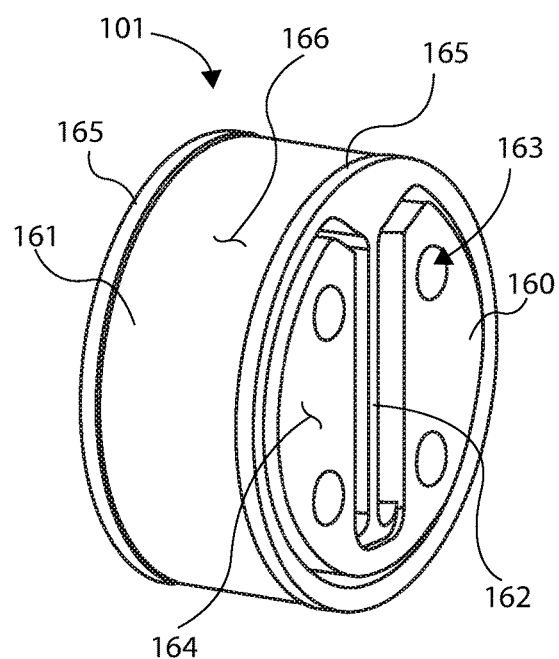
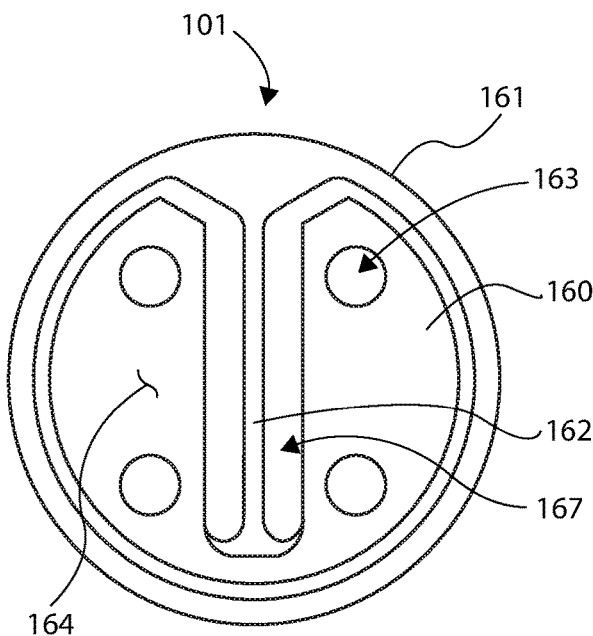
*FIG. 9A*  *FIG. 9B*
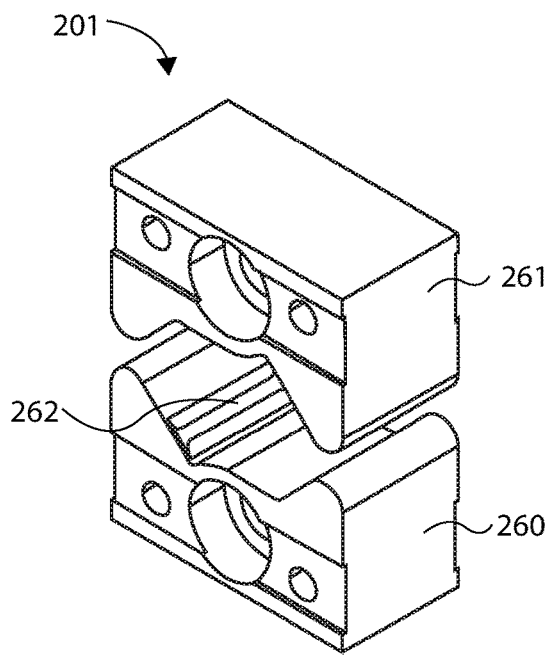
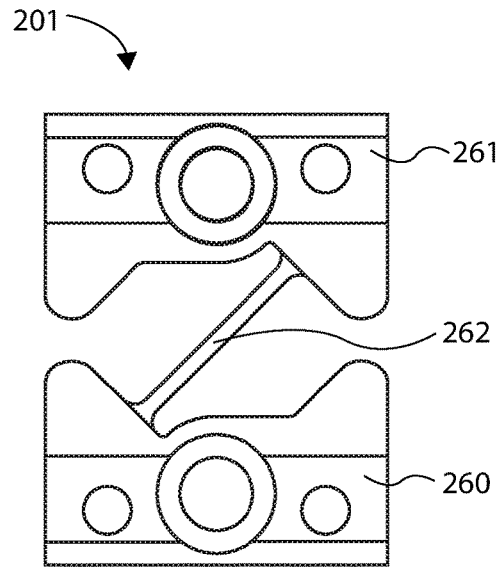
*FIG. 10A*  *FIG. 10B*

FLEXURE DEVICE

BACKGROUND

Mechanisms requiring two-axis pivot capability with large angles and high load transfer typically utilize a universal joint coupler with ball bearings or bushings to allow the pivot motion between moving bodies. In some applications (e.g., a high-precision mechanism like a steering mirror or scan mirror), however, the wear, slop, and limited life typical of bearings or bushings can be very expensive to overcome.

Flexural pivots are often utilized as a substitute for bearings in bushings in precision applications. Flexural pivots are devices that permit mechanical members to pivot about a common axis relative to each other through a limited angle range. Because angular motion is accomplished through flexing of elastic flexural elements, rather than contact surface displacement, flexural pivots operate without friction and thus without a need for lubrication. Flexural pivots can therefore be a substitute for bearings in applications where friction and/or the need for lubrication are concerns.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 9A is a perspective view of a flexure unit in accordance with an example of the present disclosure.

FIG. 9B is a front view of the flexure unit of FIG. 9A.

FIG. 10A is a perspective view of a flexure unit in accordance with another example of the present disclosure.

FIG. 10B is a front view of the flexure unit of FIG. 10A.

Figure 1:
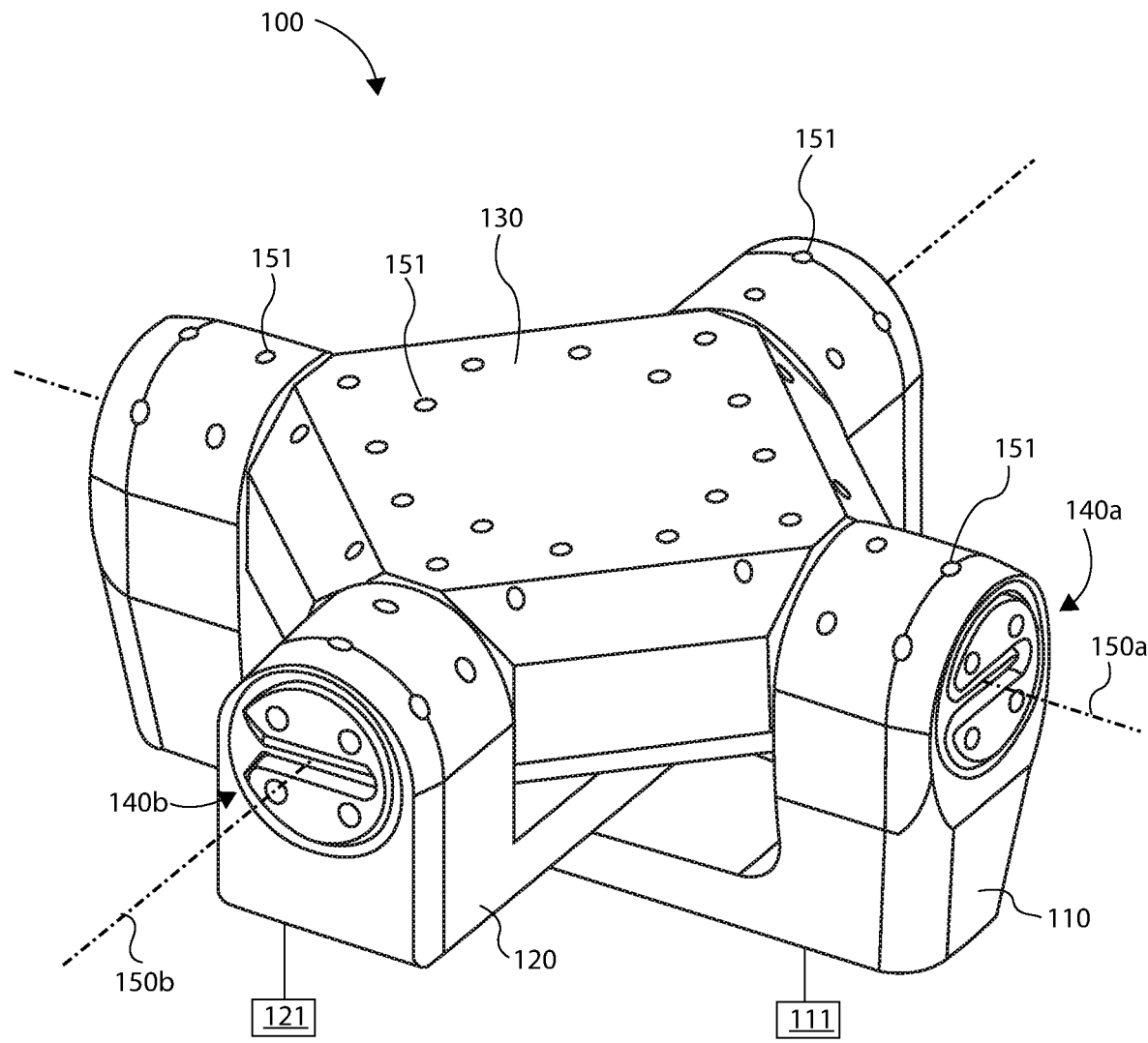
FIG. 1 is an illustration of a multi-axis flexure device in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Although flexural pivots can serve as a substitute for bearings or bushings, the limited range of angular motion typically available with flexural pivots found in two-axis devices can present problems in some applications. Two-axis flexure devices with larger angular travel (e.g., as large as ±15°) can be fabricated, but these are much larger compared to a traditional flexure (e.g., providing angular travel of ±5°) when scaled to support the same load. Although very thin and long flexure blades can provide large angular travel, these flexures will buckle at very low compression loads so there is a practical limit to the useful aspect ratio and therefore angular travel these flexures can provide. Thus, certain applications can benefit from the availability of two-axis flexural pivot devices that provide relatively large angular travel with similar load capacity to that of typical flexure devices.

Accordingly, a multi-axis flexure device is disclosed that increases the range of angular motion over typical multi-axis flexure devices (e.g., +/−eight degrees of travel for each flexure device (+/−sixteen degrees total) in some examples) and provides similar load capacity to that of typical flexure devices (e.g., 1,000 lbf load capacity, in some examples). The multi-axis flexure device can include a first support base, a second support base, and a central coupler. The multi-axis flexure device can also include a first flexure device rotatably coupling the first support base and the central coupler to one another to facilitate rotation about a first axis, and a second flexure device rotatably coupling the second support base and the central coupler to one another to facilitate rotation about a second axis. Each flexure device can include a first flexure, a second flexure, and a flexure coupler coupled to the first and second flexures. The first flexure of the first flexure device can be coupled to the first support base to facilitate relative rotation between the first support base and the flexure coupler of the first flexure device about the first axis. The second flexure of the first flexure device can be coupled to the central coupler to facilitate relative rotation between the central coupler and the flexure coupler of the first flexure device about the first axis. The first flexure of the second flexure device can be coupled to the second support base to facilitate relative rotation between the second support base and the flexure coupler of the second flexure device about the second axis. The second flexure of the second flexure device can be coupled to the central coupler to facilitate relative rotation between the central coupler and the flexure coupler of the second flexure device about the second axis.

A flexure unit is also disclosed that can include a coupler body, a flexure body at least partially surrounding the coupler body, and a single flexible member coupling the flexure body and the coupler body to one another. The flexible member can be operable to facilitate relative rotational movement between the flexure body and the coupler body about an axis.

Additionally, a flexure device is disclosed that can include a first plurality of flexure units and a second plurality of flexure units coupled to one another in series along an axis. Each flexure unit can have a coupler body, a flexure body, and a single flexible member coupling the flexure body and the coupler body to one another. The single flexible member can be operable to facilitate relative rotational movement between the flexure body and the coupler body about the axis. The coupler bodies of the first and second pluralities of flexure units can be fixedly coupled to one another. The flexure bodies of the first plurality of flexure units can be fixedly coupled to one another. The flexure bodies of the second plurality of flexure units can be fixedly coupled to one another. The flexure bodies of the first plurality of flexure units can be rotatable relative to the coupler bodies of the first and second pluralities of flexure units about the axis, and the flexure bodies of the second plurality of flexure units can be rotatable relative to the coupler bodies of the first and second pluralities of flexure units about the axis to facilitate rotation of the flexure bodies of the first plurality of flexure units relative to the flexure bodies of the second plurality of flexure units about the axis.

Figure 2:
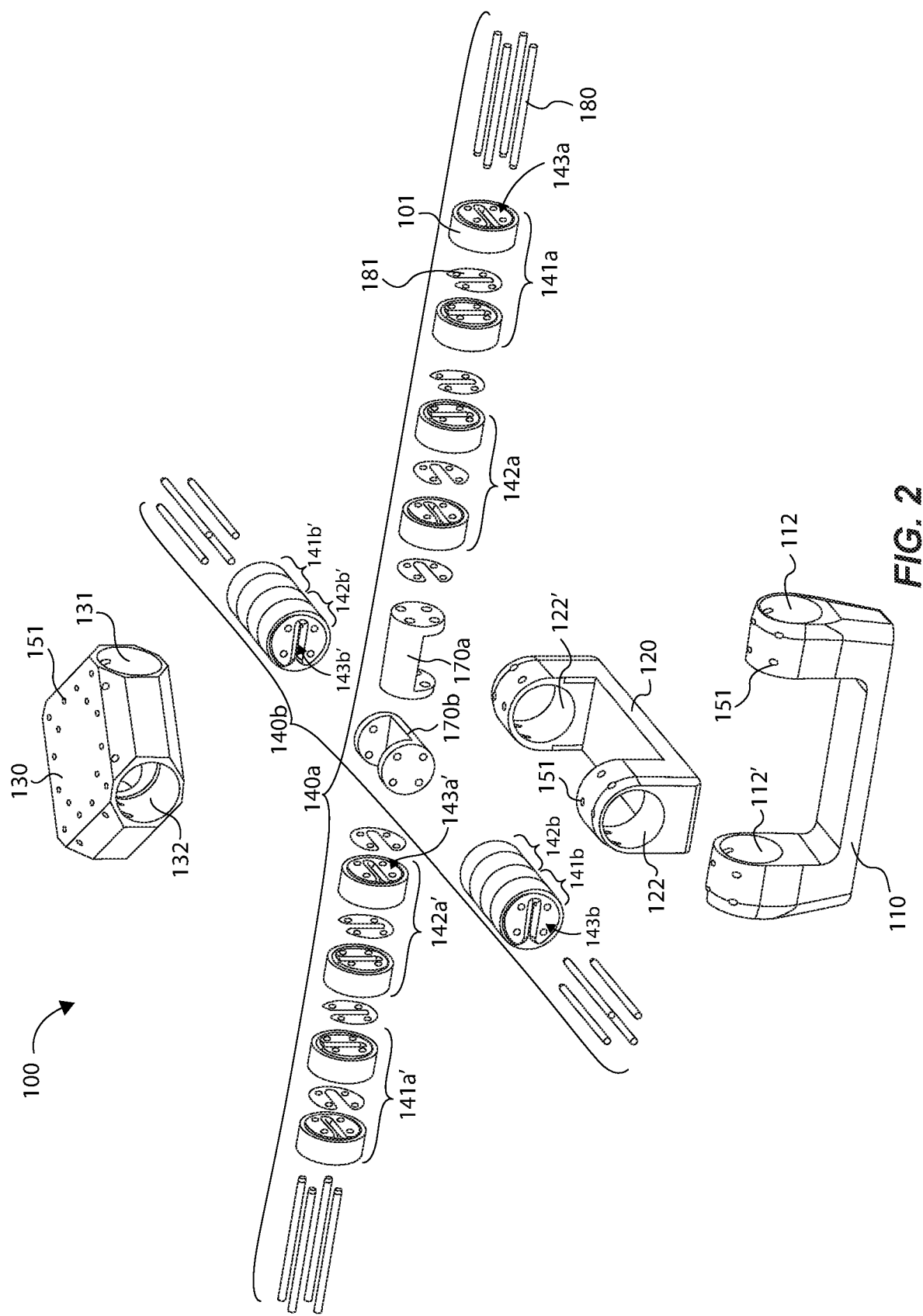
FIG. 2 is an exploded view of the multi-axis flexure device of FIG. 1 in accordance with an example of the present disclosure.
Figure 3:
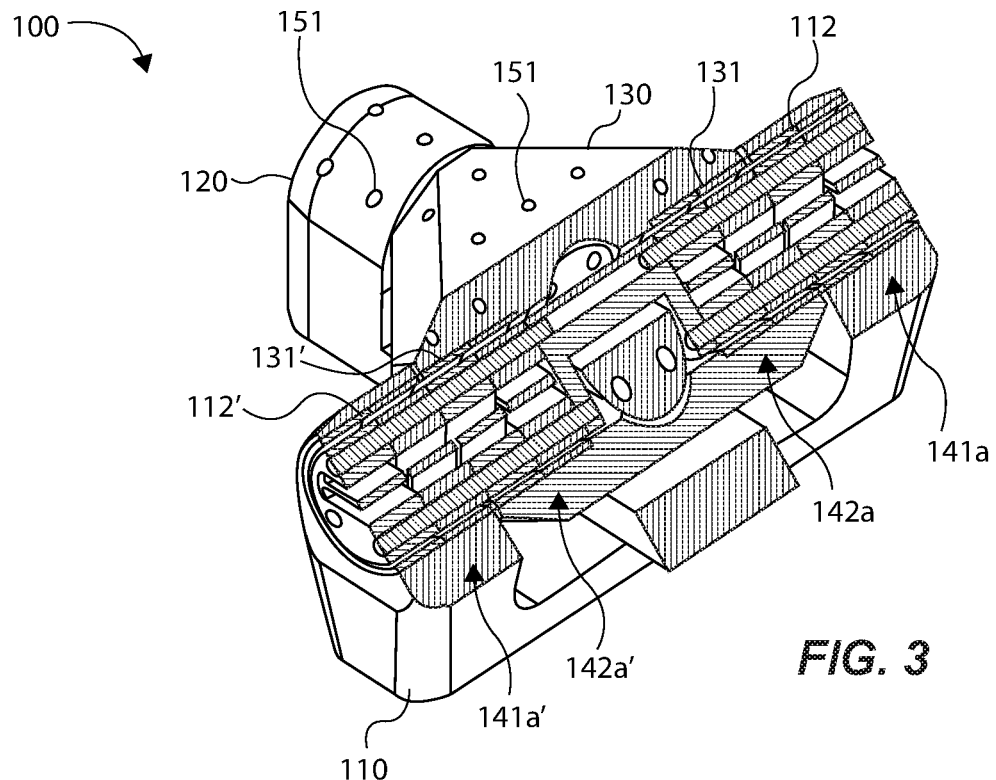
FIG. 3 is a cross-sectional view of the multi-axis flexure device of FIG. 1 in accordance with an example of the present disclosure.
Figure 4:
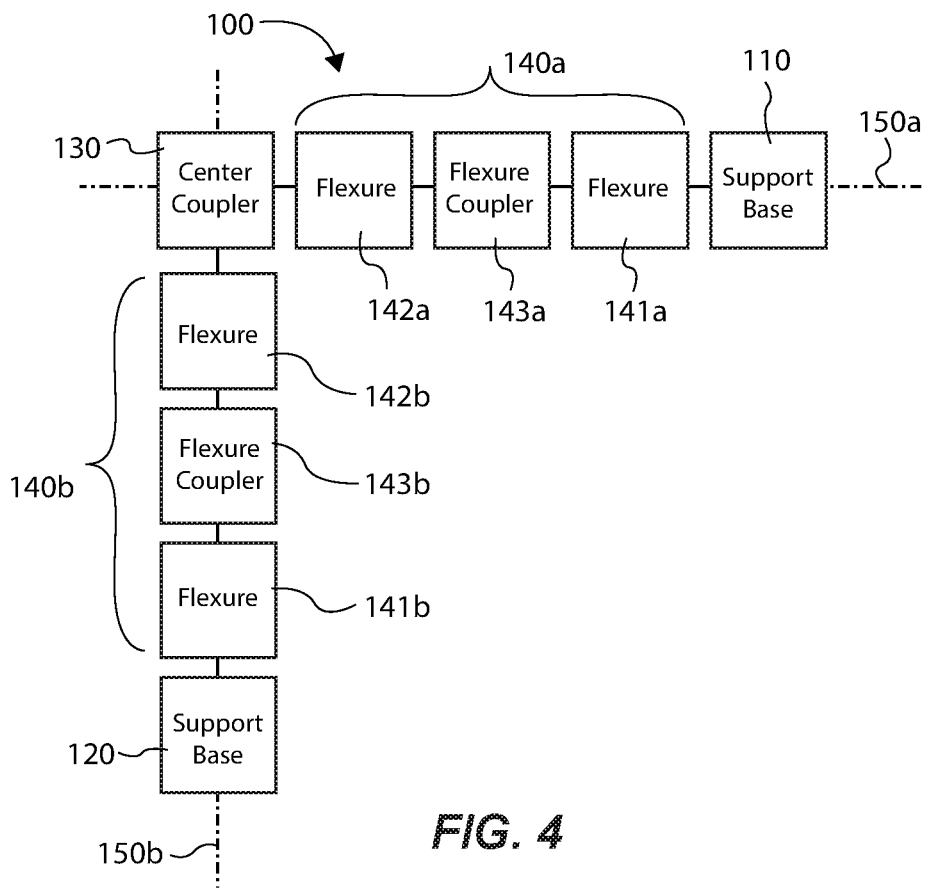
FIG. 4 is a schematic diagram of the multi-axis flexure device of FIG. 1 in accordance with an example of the present disclosure.

To further describe the present technology, examples are now provided with reference to the figures. With reference to FIG. 1, one embodiment of a multi-axis flexure device 100 is illustrated. An exploded view of the multi-axis flexure device 100 is shown in FIG. 2, a cross-section of the device 100 is shown in FIG. 3, and a schematic diagram of the device 100 is shown in FIG. 4. The multi-axis flexure device 100 can comprise support bases 110, 120, a central coupler 130, and flexure devices 140a, 140b (two stages each for a total of four stages). The central coupler 130 is shown isolated and in cross-section in FIG. 5, and the flexure devices 140a, 140b are shown isolated and in cross-section in FIG. 6. The flexure device 140a can rotatably couple the support base 110 and the central coupler 130 to one another to facilitate rotation about an axis 150a. The flexure device 140b can rotatably couple the support base 120 and the central coupler 130 to one another to facilitate rotation about an axis 150b. In one aspect, the central coupler 130 can be configured to couple with the flexure devices 140a, 140b such that the axes 150a, 150b are perpendicular.

Figure 7:
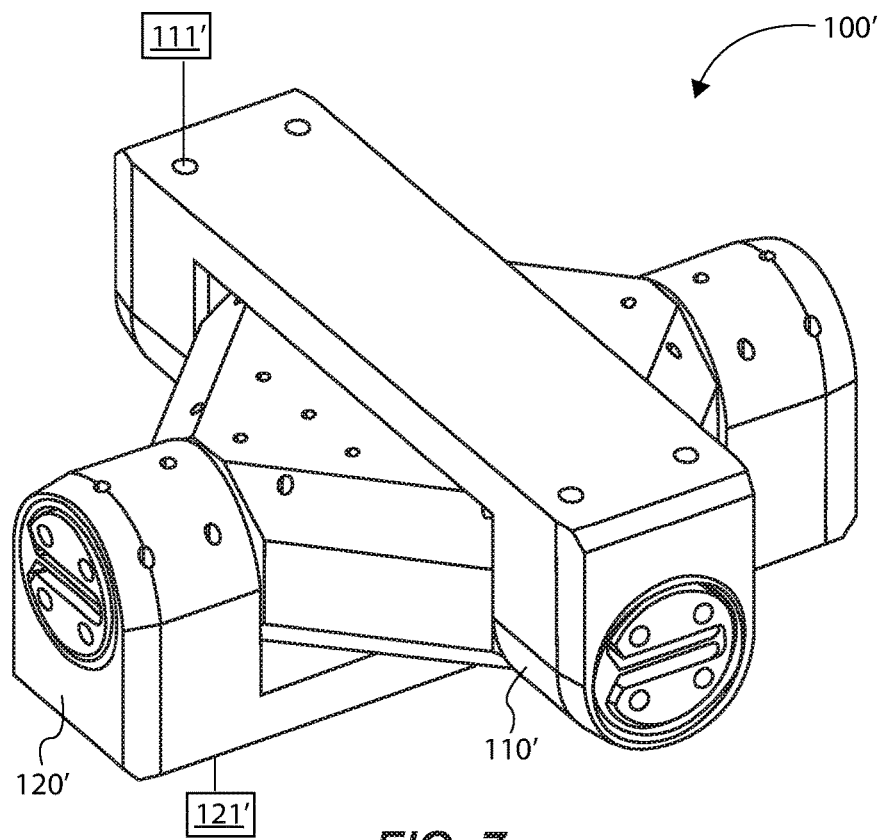
FIG. 7 is an illustration of a multi-axis flexure device in accordance with another example of the present disclosure.

The support bases 110, 120 can be configured to be coupled to external components or structures 111, 121, respectively, which are to undergo rotation relative to one another about the axes 150a, 150b. For example, the structure 121 may be a movable body (e.g., a mirror) and the structure 111 can be a base or support structure for the movable body. The support bases 110, 120 can have any suitable configuration to facilitate coupling with the structures 111, 121 which may be influenced by a desired packaging configuration of the structures 111, 121. The embodiment illustrated in FIG. 1 shows support bases 110, 120 configured to interface with the structures 111, 121 on the same side of the device 100. In an alternate embodiment shown in FIG. 7, a multi-axis flexure device 100' can include support bases 110', 120' that are configured to interface with respective structures 111', 121' on opposite sides of the device 100'.

With further reference to FIGS. 1-6, the flexure device 140a can comprise flexures 141a, 142a and a flexure coupler 143a coupled to the flexures 141a, 142a. The flexure 141a can be coupled to the support base 110 (e.g., at 112 in FIGS. 2 and 3) to facilitate relative rotation between the support base 110 and the flexure coupler 143a about the axis 150a. The flexure 141a coupled between the support base 110 and the flexure coupler 143a can form a first stage of rotation of the flexure device 140a about the axis 150a. The flexure 142a can be coupled to the central coupler 130 (e.g., at 131 in FIGS. 2, 3, and 5) to facilitate relative rotation between the central coupler 130 and the flexure coupler 143a about the axis 150a. The flexure 142a coupled between the flexure coupler 143a and the central coupler 130 can form a second stage of rotation of the flexure device 140a about the axis 150a. In some embodiments, the first and second stages of rotation provided by the respective flexures 141a, 142a can each provide about ±8 degrees of rotational travel about the axis 150a. Relative rotational movement between the support base 110 and the central coupler 130 about the axis 150a is a sum of the relative rotational movements of the first and second stages of rotation of the flexure device 140a. Thus, in some embodiments, the flexure device 140a with two stages of rotation can provide about ±16 degrees of rotational travel about the axis 150a.

Similarly, the flexure device 140b can comprise flexures 141b, 142b and a flexure coupler 143b coupled to the flexures 141b, 142b. The flexure 141b can be coupled to the support base 120 (e.g., at 122 in FIG. 2) to facilitate relative rotation between the support base 120 and the flexure coupler 143b about the axis 150b. The flexure 141b coupled between the support base 120 and the flexure coupler 143b can form a first stage of rotation of the flexure device 140b. The flexure 142b can be coupled to the central coupler 130 (e.g., at 132 in FIGS. 2 and 5) to facilitate relative rotation between the central coupler 130 and the flexure coupler 143b about the axis 150b. The flexure 142b coupled between the flexure coupler 143b and the central coupler 130 can form a second stage of rotation of the flexure device 140b about the axis 150b. In some embodiments, the first and second stages of rotation provided by the respective flexures 141b, 142b can each provide about ±8 degrees of rotational travel about the axis 150a. Relative rotational movement between the support base 120 and the central coupler 130 about the axis 150b is a sum of the relative rotational movements of the first and second stages of rotation of the flexure device 140b. Thus, in some embodiments, the flexure device 140b with two stages of rotation can provide about ±16 degrees of rotational travel about the axis 150b.

Two stage rotation provided by a flexure device about only a single axis is disclosed in U.S. Pat. No. 8,556,533, which is incorporated herein by reference in its entirety. By utilizing the central coupler 130 in the configuration described above between the flexure couplers 143a, 143b and the respective support bases 110, 120, the present disclosure provides a single flexure device that enables two stage rotation in multiple axes (or more specifically, two stage rotation in each of multiple axes (e.g., four stages total utilizing the two flexure devices 140a and 140b extending along orthogonal axes, respectively)).

Figure 8:
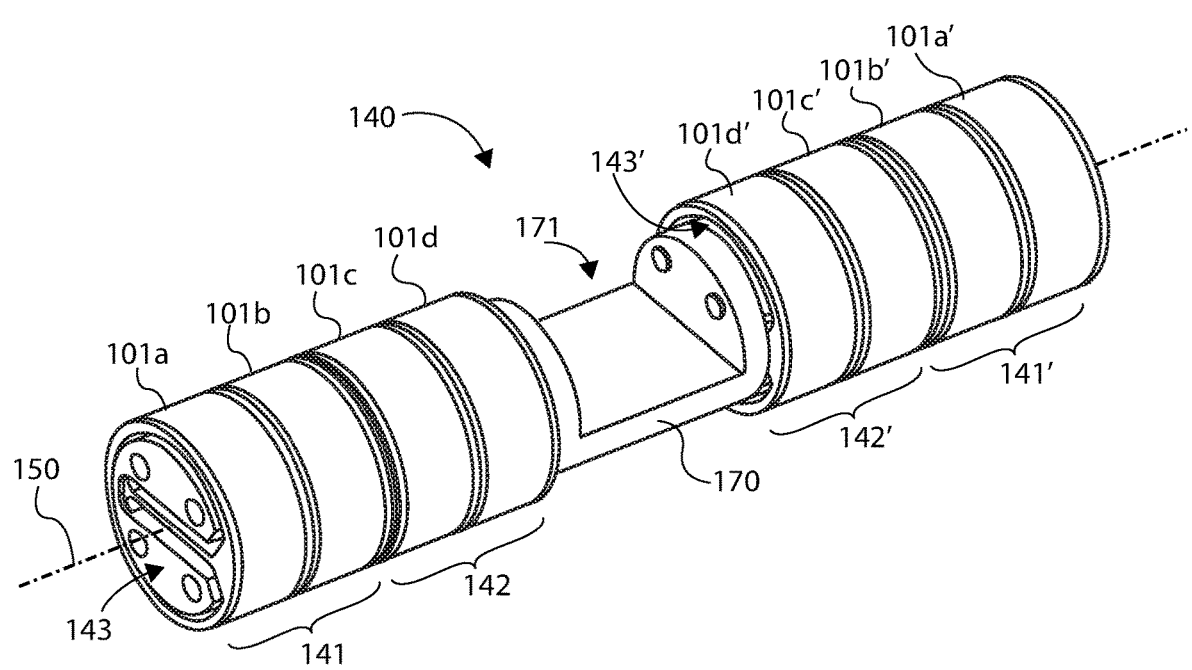
FIG. 8 is an illustration of a single-axis flexure device in accordance with an example of the present disclosure.

In the example illustrated in FIG. 1, multi-axis rotation is achieved by utilizing two single-axis, two-stage flexure devices 140*a*, 140*b* (for a total of four stages). In one aspect, these flexure devices 140*a*, 140*b* can be identical. A representative two-stage flexure device 140 is shown in FIG. 8, which can be included in a multi-axis flexure device or a single-axis flexure device. The flexure device 140 can comprise a first plurality of flexure units 101*a-d*, which can be modular "building blocks" to construct the flexure device 140. A representative flexure unit 101 is shown in FIGS. 9A and 9B. In general, a flexure unit 101 can have a coupler body 160, a flexure body 161, and a flexible member 162 coupling the flexure body 161 and the coupler body 160 to one another.

As shown in FIG. 8, the flexure units 101*a-d* can be coupled mechanically together in series along an axis 150 (e.g., arranged in a "stack"). As described in more detail below, the flexure units 101*a-d* can be coupled in a manner that can form flexures 141, 142 (e.g., the flexures 141*a-b*, 142*a-b* of the device 100) and a flexure coupler 143 (e.g., the flexure couplers 143*a-b* of the device 100). Thus, the flexure units 101*a-d* can be assembled to provide two-stage rotation about the axis 150 as discussed above. It should also be recognized that a single flexure (e.g., the flexure 141) can be used alone or in any combination in any suitable flexure pivot or device regardless of whether a given flexure device is configured for single or multiple stage rotation. In some embodiments, the flexure device 140 can include a second plurality of flexure units 101*a'-d'*, which can be identical to the stack of flexure units 101*a-d*. For example, the flexure units 101*a'-d'* can be coupled mechanically together in series to form flexures 141', 142' (e.g., flexures 141*a'-b'*, 142*a'-b'* of the device 100 shown in FIG. 2) and a flexure coupler 143' (e.g., flexure couplers 143*a'*-b of the device 100 shown in FIG. 2). Thus, the flexure units 101*a'-d'* can also be assembled to provide two-stage rotation as discussed above.

Figure 6:
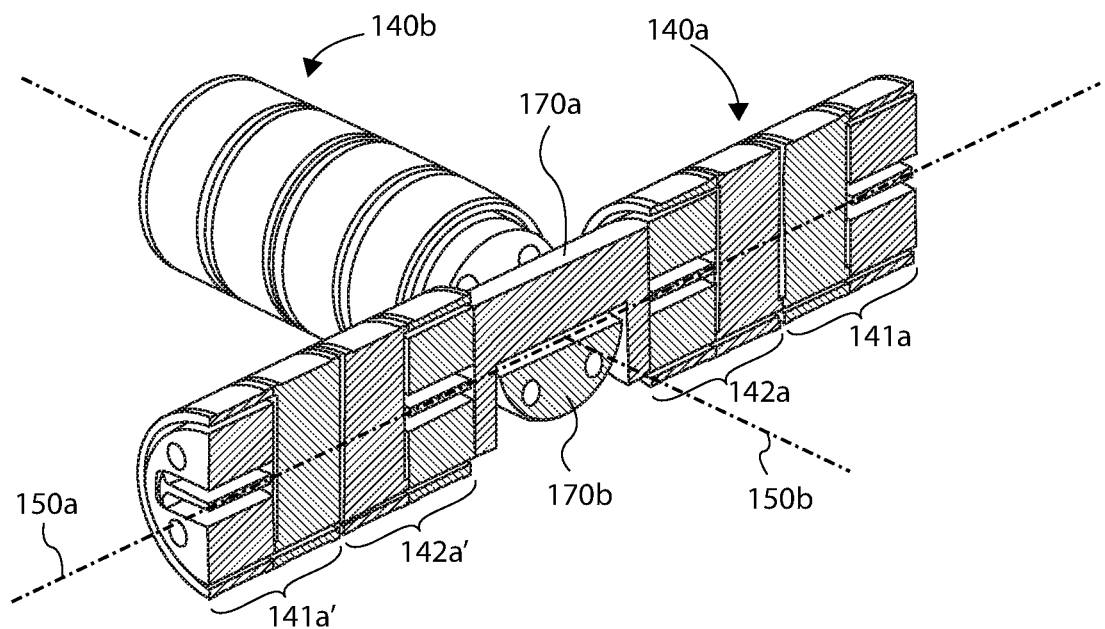
FIG. 6 is a cross-sectional view of two single-axis flexure devices utilized in the multi-axis flexure device of FIG. 1 and isolated from other components of the multi-axis flexure device of FIG. 1, in accordance with an example of the present disclosure.

In some embodiments, the flexure units 101*a'-d'* can be coupled to the flexure units 101*a-d* by a bridge connector 170. The bridge connector 170 can be coupled between two flexure units (e.g., the coupler bodies of flexure units 101*d*, 101*d'*) to separate or space apart the flexure units from one another along a rotation axis (e.g., the axis 150). In one aspect, the bridge connector 170 can include a recess 171, which can enable co-nesting of two bridge connectors when the flexure device 140 is used in a multi-axis flexure device. For example, as shown in FIGS. 2 and 6, bridge connectors 170*a*, 170*b* of the respective flexure devices 140*a*, 140*b* can have complementary recesses configured to locate portions of the bridge connectors 170*a*, 170*b* off the respective axes 150*a*, 150*b* to facilitate rotation of the bridge connectors 170*a*, 170*b* about the respective axes 150*a*, 150*b* without interference of the bridge connectors 170*a*, 170*b*. Thus, in one aspect, as illustrated in FIGS. 2 and 6, the bridge connectors 170*a*, 170*b* can enable positioning of the flexure devices 140*a*, 140*b* such that the axes 150*a*, 150*b* intersect.

Referring to FIGS. 9A and 9B, the flexible member 162 (e.g., a single flexible member) of the flexure unit 101 can be operable to facilitate relative rotational movement between the flexure body 161 and the coupler body 160 about an axis, such as the axis 150 in FIG. 8. The flexible member 162 can have any suitable configuration, such as a blade configuration as in the illustrated embodiment. The flexible member 162 can have any suitable dimension, as the principles disclosed herein provide flexible blade units that are scalable to accommodate a wide range of sizes and applications.

The flexure unit 101 can have any suitable outer shape or general profile, such as rectangular, circular, elliptical, etc. The general outer shape or profile of the flexure unit 101 shown in FIGS. 9A and 9B is circular. The general outer shape or profile of a given flexure unit 101 may be governed by the shape or design of the support bases 110, 120, and/or the central coupler 130, space constraints, etc. In some embodiments, the flexure body 161 can at least partially surround the coupler body 160. In the embodiment illustrated in FIGS. 9A and 9B, the flexure body 161 surrounds (e.g., completely surrounds) a periphery of the coupler body 160. In this case, the shape or profile of the flexure unit 101 can be defined at least partially by the flexure body 161, which has a circular outer shape in this embodiment. Although it should be recognized that the flexure body 161 can have any suitable outer shape. The coupler body 160 can also have any suitable outer shape. In some embodiments, as in FIGS. 9A and 9B, the coupler body 160 can have a circular outer shape, which may or may not correspond or be similar to the outer shape of the flexure body 161. In one aspect, the flexible member 162 can extend through a slot 167 of the coupler body 160. This configuration can effectively center the mass of the coupler body 160 about the rotation axis (e.g., the axis 150 in FIG. 8), which can provide good off-axis stiffness that is substantially the same in any direction, as well as a favorable vibration response.

The flexure unit 101 can be formed in any suitable manner utilizing any suitable process or combination of processes. For example, the flexure unit 101 may be formed by machining, extruding, casting, forging, etc. Example machining processes include electrical discharge machining (EDM), water jet cutting, milling, broaching, etc. A manufacturing process may be selected based on the design objectives, tolerance requirements, cost, etc. A wire EDM process may provide precise machining that can meet tight tolerances and accurately control the flexure surfaces, which may be highly stressed during operation. The flexure unit 101 can be made of any suitable material, such as titanium or steel.

In one aspect, the flexible member 162 can be directly coupled to the coupler body 160 and directly coupled to the flexure body 161 to form the flexure unit 101. In some embodiments, the flexure unit 101 can be monolithic or one-piece structures. For example, the flexure body 161, the coupler body 160, and the flexible member 162 of the flexure unit 101 can form a monolithic or one-piece structure created from a single workpiece or item of material.

As modular components, two or more of the flexure units 101 can be combined to form a flexure (e.g., the flexures 141, 141', 142, 142' of FIG. 8). Typically, the flexure units 101 will be arranged such that the flexible members 162 are arranged in a cross configuration (e.g., to form a cross blade flexure). For example, two or more of the flexure units 101 can be rotated or "clocked" such that the flexible members 162 are oriented or arranged substantially 90 degrees (i.e., perpendicular or orthogonal) relative to one another to achieve a cross blade configuration (see orientation of flexure units in FIG. 2). In one aspect, the flexure units 101 of the flexures 141*a-b*, 141*a-b'*, 142*a-b*, 142*a-b'* can be substantially identical.

In one aspect, the coupler bodies 160 of multiple flexure units 101 can be coupled together to form a flexure coupler (e.g., the flexure couplers 143, 143' of FIG. 8). The coupler bodies 160 of the flexure units 101 can be coupled to one another in any suitable manner. For example, as shown in FIG. 2, flexure units can be coupled to one another with fasteners 180 (e.g., bolts, screws, pins, etc.), braze material (e.g., braze foil 181 between adjacent coupler bodies 160), adhesive material, weld material, etc. Accordingly, the coupler body 160 can have openings 163 configured to receive fasteners of any type.

Referring to FIGS. 9A and 9B, the coupler body 160 can include interface surfaces 164 on opposite sides of the coupler body 160 to interface with an adjacent component (e.g., the coupler bodies 160 of adjacent flexure units 101). Typically, the interface surfaces 164 will be planar. In one aspect, the flexible member 162 of the flexure unit 101 can be prevented from contacting an adjacent component (e.g., another flexure unit 101 and/or another structure or component to which the flexure unit 101 may be coupled, such as the bridge connector 170 in FIG. 8) to facilitate smooth, unrestricted movement of the flexible member 162 during operation. For example, the flexible member 162 can be recessed relative to the interface surfaces 164 of the coupler body 160 to prevent the flexible member 162 from contacting an adjacent component, such as another flexure unit 101. In other words, an outer surface of the flexible member 162 may not be coplanar or flush with the interface surfaces 164 of the coupler body 160 and may be contained within an outer space envelope of the flexure unit 101 defined at least in part by the interface surfaces 164. The flexure bodies 161 can include interface surfaces 165 configured to interface with components such as the support bases 110, 120 and the central coupler 130, as described in more detail below.

To facilitate two stage rotation, and as shown in FIG. 8, the coupler bodies 160 of the flexure units 101a-d can be fixedly coupled to one another to form a rigid body that serves as a flexure coupler (e.g., the flexure couplers 143a-b). The coupler bodies 160 of the flexure units 101a'-d' can also be fixedly coupled to one another to form a rigid body that serves as a flexure coupler (e.g., the flexure couplers 143a'-b'). Although not required, in the illustrated embodiment the coupler bodies 160 of the flexure units 101a-d and the flexure units 101a'-d' are fixedly coupled to one another by the bridge connector 170, such that the coupler bodies 160 of the flexure units 101a-d, 101a'-d' and the bridge connector 170 form a rigid body that serves as a flexure coupler. The bridge connector 170 can be coupled to the coupler bodies 160 in any suitable manner, such as utilizing the fasteners 180 and braze material (e.g., the braze foil 181). Although not required, including the bridge connector 170 in the flexure device 140 can connect the flexure units 101a-d with the flexure units 101a'-d' such that the coupler bodies 160 of these flexure units act as a single rigid body flexure coupler for increased off-axis stiffness.

To further facilitate two stage rotation, the flexure bodies 161 of the flexure units 101a-b can be fixedly coupled to one another thus forming a flexure 141, and the flexure bodies 161 of the flexure units 101c-d can be fixedly coupled to one another thus forming a flexure 142. Similarly, the flexure bodies 161 of the flexure units 101a'-b' can be fixedly coupled to one another, thus forming a flexure 141', and the flexure bodies 161 of the flexure units 101c'-d' can be fixedly coupled to one another thus forming a flexure 142'. The flexure bodies 161 of the flexure units 101a-b, 101a'-b' can therefore be rotatable relative to the coupler bodies 160 of the flexure units 101a-d, 101a'-d' about the axis 150, and the flexure bodies 161 of the flexure units 101c-d, 101c'-d' can be rotatable relative to the coupler bodies 160 of the flexure units 101a-d, 101a'-d' about the axis 150 to facilitate rotation of the flexure bodies 161 of the flexure units 101a-b, 101a'-b' relative to the flexure bodies 161 of the flexure units 101c-d, 101c'-d' about the axis 150 to achieve two stage rotation.

Figure 5:
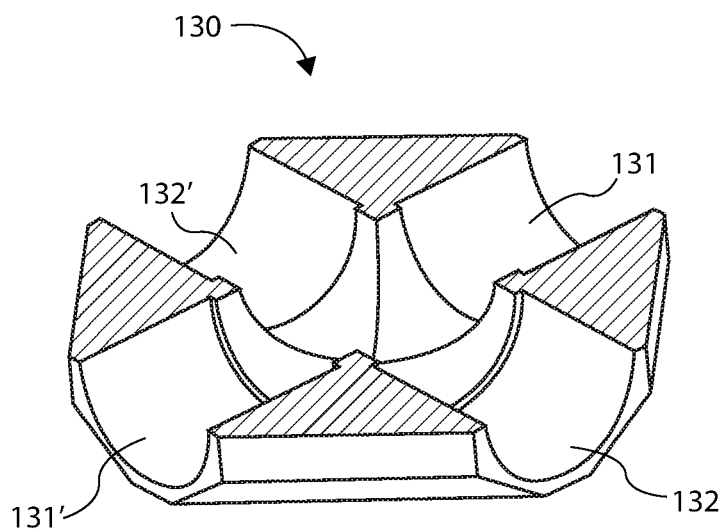
FIG. 5 is a cross-sectional view of a central coupler of the multi-axis flexure device of FIG. 1, in accordance with an example of the present disclosure.

With regard to the multi-axis flexure device 100 illustrated in whole or in part in FIGS. 1-6, the flexure bodies 161 of the flexure units 101a-b, 101a'-b' forming the flexures 141a, 141a' can be fixedly coupled to the support base 110 (e.g., via flexure body interface surfaces 165 at respective interface surfaces 112, 112' as shown in FIGS. 2 and 3), and the flexure bodies 161 of the flexure units 101c-d, 1-1c'-d' forming the flexures 142a, 142a' can be fixedly coupled to the central coupler 130 (e.g., via flexure body interface surfaces 165 at respective interface surfaces 131, 131' as illustrated in FIGS. 2 and 5). Similarly, the flexure bodies 161 of the flexure units 101a-b, 1-1a'-b' forming the flexures 141b, 141b' can be fixedly coupled to the support base 120 (e.g., via flexure body interface surfaces 165 at interface surfaces 122, 122' as shown in FIG. 2), and the flexure bodies 161 of the flexure units 101c-d, 101c'-d' forming the flexures 142b, 142b' can be fixedly coupled to the central coupler 130 (e.g., via flexure body interface surfaces 165 at interface surfaces 132, 132' as shown in FIGS. 2 and 5). Thus, in the illustrated embodiment of the multi-axis flexure device 100, the "outer" flexures 141a, 141a' and 141b, 141b' of the flexure devices 140a, 140b can be connected to the respective support bases 110, 120, and the "inner" flexures 142a, 142a' and 142b, 142b' can be connected to the central coupler 130.

Flexure units 101 can be coupled to the support bases 110, 120 and the central coupler 130 in any suitable manner, such as with fasteners (e.g., bolts, screws, pins, etc.), braze material, adhesive material, weld material, etc. In one embodiment, shown in FIG. 9A, the flexure unit 101 can include a recessed surface 166 (e.g., recessed between interface surfaces 165) on the flexure body 161. The recessed surface 166 can be configured to facilitate the flow of liquid coupling material (e.g., a braze material, an adhesive, etc.) at least partially about the flexure body 161 (e.g., by forming a flow channel), which can be hardened to couple the flexure unit 101 to another component. As shown in FIGS. 1-3, the support bases 110, 120 and the central coupler 130 can include access ports or openings 151 that extend to the various coupling interface surfaces 112, 112', 122, 122', 131, 131', 132, 132' of the support bases 110, 120 and the central coupler 130 to receive liquid coupling material once the components of the flexure device 100 have been assembled. At this point, liquid coupling material can be dispensed into the access ports 151 and the recessed surfaces 166 of the flexure units 101 can facilitate flow of the liquid coupling material about the flexure bodies 161 of the flexure units 101 to couple the flexure units 101 to the interface surfaces 112, 112', 122, 122', 131, 131', 132, 132' of the support bases 110, 120 and the central coupler 130. In some embodiments, coupling material can be initially provided to the access openings 151 in a solid state, and can be melted to flow through the access openings 151 and about the flexure body 161.

Although the flexure unit 101 shown in FIGS. 9A and 9B has a flexure body 161 that at least partially surrounds the coupler body 166, it should be recognized that a flexure unit 101 can have any suitable flexure body and coupler body configuration. FIGS. 10A and 10B illustrate a flexure unit 201 in accordance with another example of the present disclosure. As with the flexure unit 101 of FIGS. 9A and 9B, the flexure unit 201 can include a coupler body 260, a flexure body 261, and a flexible member 262 coupling the flexure body 261 and the coupler body 260 to one another. In one aspect, multiple flexure units 201 can be stacked back to back to achieve a flexure having a cross blade configuration. In addition, multiple flexure units 201 can be coupled in the manner discussed above with regard to the flexure units 101 to provide two-stage rotation about a single axis or multiple axes. For example, as with the flexures 141, 142 of FIG. 8, two pairs of flexure units 201 can be configured to provide two-stage rotation of two components about a single axis. In this case, the flexure units 201 of each pair can be arranged in a cross blade configuration to form a flexure similar to the flexures 141, 142 of FIG. 8. The coupler bodies 260 of all four flexure units 201 can be fixedly coupled to one another to form a flexure coupler as described above. The flexure bodies 261 of one pair of flexure units 201 can be fixedly coupled to one external component and the flexure bodies 261 of the other pair of flexure units 201 can be fixedly coupled to the other external component to provide relative rotation of the two external components. The flexure unit 201 can therefore be utilized in a manner similar to that described above with respect to the flexure unit 101 to construct single or multi axis flexure devices which may or may not be configured to provide multiple stages of rotation. Although a flexure body 261 and a coupler body 260 have been identified in the embodiment of the flexure unit 201 shown in FIGS. 10A and 10B, it should be recognized that either body coupled to opposite ends of the flexible member 262 can serve as a flexure body or a coupler body as described herein.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A flexure unit, comprising:
   a coupler body;
   a flexure body at least partially surrounding the coupler body; and
   a single flexible member coupling the flexure body and the coupler body to one another, wherein the flexible member is operable to facilitate relative rotational movement between the flexure body and the coupler body about an axis;
   wherein the coupler body comprises one or more coupling interfaces configured to facilitate coupling the flexure unit to another flexure unit,
   wherein the one or more coupling interfaces of the coupler body protrude out from the flexure body.

2. The flexure unit of claim 1, wherein the flexure body surrounds a periphery of the coupler body.

3. The flexure unit of claim 1, wherein the flexible member extends through a slot of the coupler body.

4. The flexure unit of claim 1, wherein the coupler body comprises an interface surface as the one or more coupling interfaces for interfacing with an adjacent component.

5. The flexure unit of claim 4, wherein the flexible member is recessed relative to the interface surface to prevent the flexible member from contacting the adjacent component.

6. The flexure unit of claim 1, wherein the flexure body has a circular outer shape.

7. The flexure unit of claim 1, wherein the coupler body has a circular outer shape.

8. The flexure unit of claim 1, wherein the flexible member has a blade configuration.

9. The flexure unit of claim 1, wherein the flexure body, the coupler body, and the flexible member form a monolithic structure.

10. A flexure device, comprising:
    a first plurality of flexure units and a second plurality of flexure units coupled to one another in series along an axis, each flexure unit having
    a coupler body,
    a flexure body at least partially surrounding the coupler body, and
    a single flexible member coupling the flexure body and the coupler body to one another, wherein the single flexible member is operable to facilitate relative rotational movement between the flexure body and the coupler body about the axis, and
    wherein the coupler bodies of the first and second pluralities of flexure units are fixedly coupled to one another, the flexure bodies of the first plurality of flexure units are fixedly coupled to one another, and the flexure bodies of the second plurality of flexure units are fixedly coupled to one another,
    such that the flexure bodies of the first plurality of flexure units are rotatable relative to the coupler bodies of the first and second pluralities of flexure units about the axis, and the flexure bodies of the second plurality of flexure units are rotatable relative to the coupler bodies of the first and second pluralities of flexure units about the axis to facilitate rotation of the flexure bodies of the first plurality of flexure units relative to the flexure bodies of the second plurality of flexure units about the axis.

11. The flexure device of claim 10, further comprising a bridge connector coupled between two of the coupler bodies to separate at least two of the first plurality of flexure units from one another along the axis.

12. The flexure device of claim 10, wherein the flexible members of at least two of first plurality of flexure units and at least two of the second plurality of flexure units are arranged substantially perpendicular to one another.

13. The flexure device of claim 10, wherein the flexure body at least partially surrounds the coupler body.

14. A multi-axis flexure device, comprising:
- a first support base;
- a second support base;
- a central coupler;
- a first flexure device rotatably coupling the first support base and the central coupler to one another to facilitate rotation about a first axis; and
- a second flexure device rotatably coupling the second support base and the central coupler to one another to facilitate rotation about a second axis,
- each flexure device comprising a first flexure comprising a flexible member, a second flexure comprising a flexible member, and a flexure coupler coupled to the first and second flexures,
- wherein the first flexure of the first flexure device is coupled to the first support base to facilitate relative rotation between the first support base and the flexure coupler of the first flexure device about the first axis, and the second flexure of the first flexure device is coupled to the central coupler to facilitate relative rotation between the central coupler and the flexure coupler of the first flexure device about the first axis,
- wherein the first flexure of the second flexure device is coupled to the second support base to facilitate relative rotation between the second support base and the flexure coupler of the second flexure device about the second axis, and the second flexure of the second flexure device is coupled to the central coupler to facilitate relative rotation between the central coupler and the flexure coupler of the second flexure device about the second axis, and
- wherein the flexure coupler comprises a plurality of coupler bodies, and each flexible member is coupled to one of the plurality of coupler bodies and coupled to one of a plurality of flexure bodies to form a flexure unit, the flexure bodies of the first flexure device coupling the first flexure device to the first support base and the central coupler, and the flexure bodies of the second flexure device coupling the second flexure device to the second support base and the central coupler.

15. The multi-axis flexure device of claim 14, wherein the flexible member comprises first and second flexible members arranged substantially perpendicular to one another.

16. The multi-axis flexure device of claim 14, wherein the first axis and the second axis intersect.

17. The multi-axis flexure device of claim 14, wherein the first axis and the second axis are perpendicular.

18. The multi-axis flexure device of claim 14, wherein the first flexure comprises a plurality of first flexures, the second flexure comprises a plurality of second flexures, and the flexure coupler comprises a plurality of flexure couplers.

19. The multi-axis flexure device of claim 18, further comprising:
- a first bridge connector coupled between two of the plurality of flexure couplers of the first flexure device to separate at least two of the plurality of first flexures of the first flexure device from one another along the first axis; and
- a second bridge connector coupled between two of the plurality of flexure couplers of the second flexure device to separate at least two of the plurality of first flexures of the second flexure device from one another along the second axis.

20. The multi-axis flexure device of claim 19, wherein the first and second bridge connectors each comprise complementary recesses configured to facilitate rotation of the first and second bridge connectors about the respective first and second axes.

21. A multi-axis flexure device, comprising:
- a first support base;
- a second support base;
- a central coupler;
- a first flexure device rotatably coupling the first support base and the central coupler to one another to facilitate rotation about a first axis;
- a second flexure device rotatably coupling the second support base and the central coupler to one another to facilitate rotation about a second axis, wherein each of the first and second flexure devices comprises a plurality of first flexures, a plurality of second flexures, and a plurality of flexure couplers coupled to the first and second flexures;
- a first bridge connector coupled between two of the plurality of flexure couplers of the first flexure device to separate at least two of the plurality of first flexures of the first flexure device from one another along the first axis; and
- a second bridge connector coupled between two of the plurality of flexure couplers of the second flexure device to separate at least two of the plurality of first flexures of the second flexure device from one another along the second axis;
- wherein the first flexure of the first flexure device is coupled to the first support base to facilitate relative rotation between the first support base and the flexure coupler of the first flexure device about the first axis, and the second flexure of the first flexure device is coupled to the central coupler to facilitate relative rotation between the central coupler and the flexure coupler of the first flexure device about the first axis, and
- wherein the first flexure of the second flexure device is coupled to the second support base to facilitate relative rotation between the second support base and the flexure coupler of the second flexure device about the second axis, and the second flexure of the second flexure device is coupled to the central coupler to facilitate relative rotation between the central coupler and the flexure coupler of the second flexure device about the second axis.

22. A flexure unit, comprising:
- a coupler body;
- a flexure body at least partially surrounding the coupler body; and
- a single flexible member coupling the flexure body and the coupler body to one another, wherein the flexible member is operable to facilitate relative rotational movement between the flexure body and the coupler body about an axis;
- wherein the coupler body comprises one or more openings configured to facilitate coupling the flexure unit to another flexure unit.

* * * * *